A. BALAJTHY.
HORSESHOE.
APPLICATION FILED MAR. 28, 1914.
1,113,734.
Patented Oct. 13, 1914.
2 SHEETS—SHEET 1.
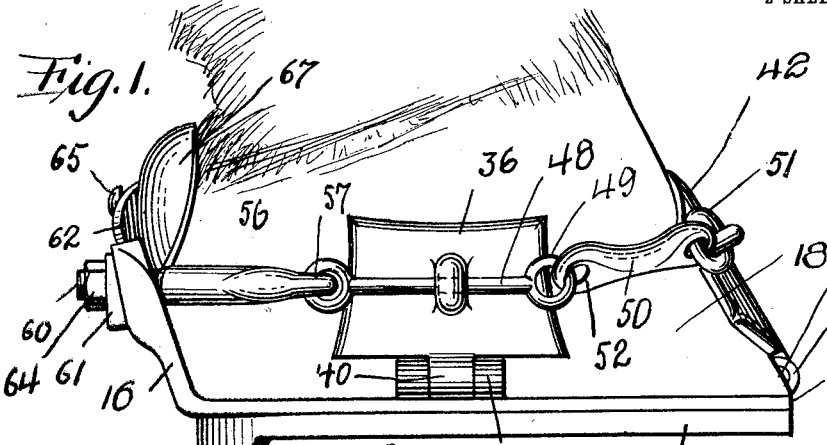
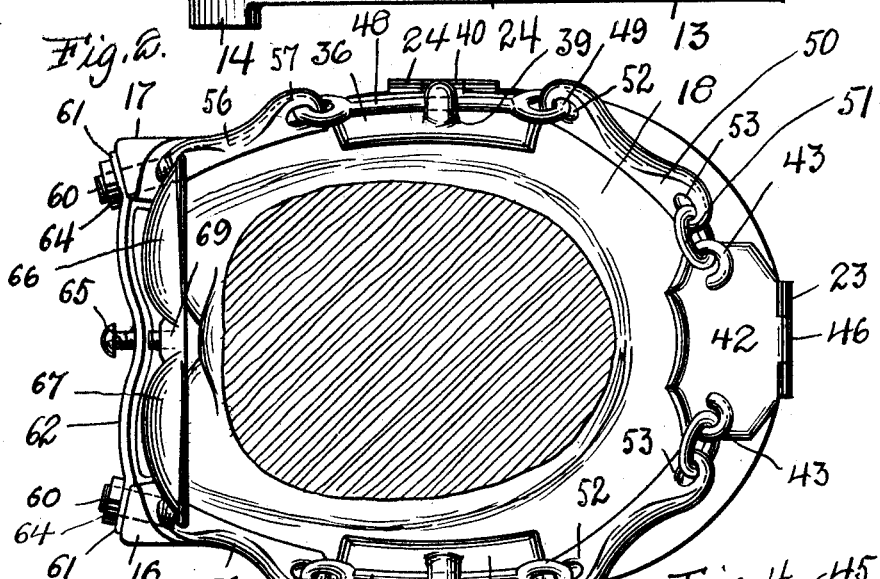
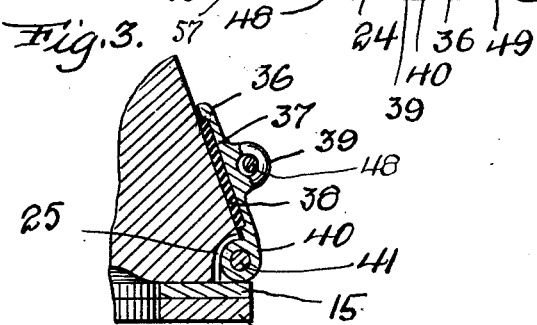
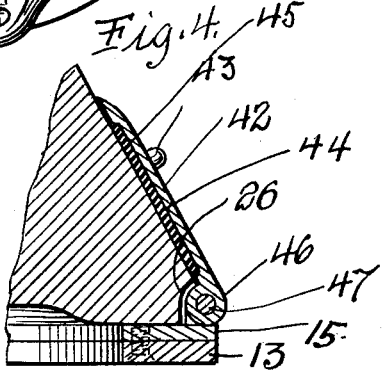
WITNESSES
Samuel Payne
Max H. Sholmig
INVENTOR
A. Balajthy
By Henry L. Evert
ATTORNEY

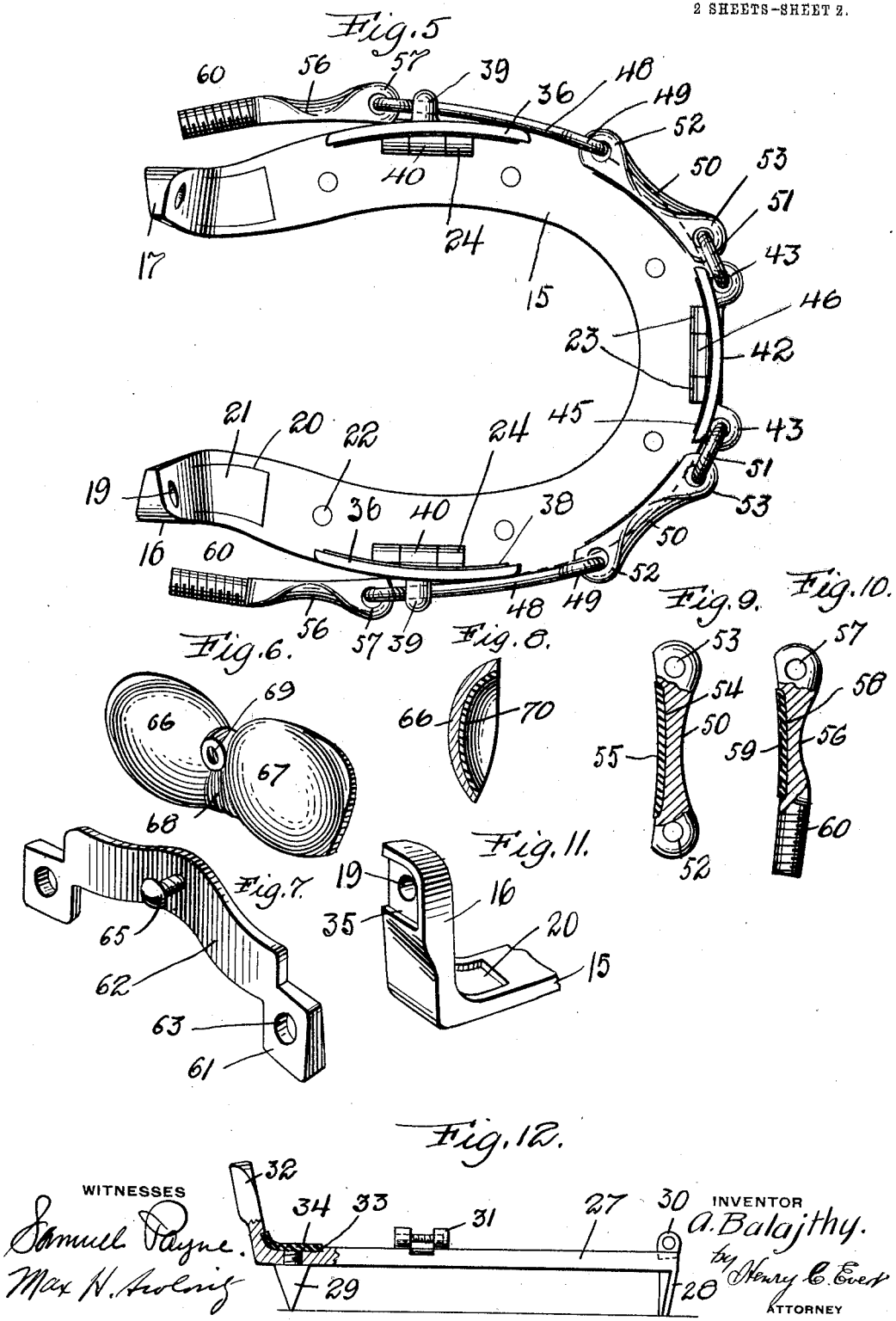

UNITED STATES PATENT OFFICE.

ANDREW BALAJTHY, OF PHOENIXVILLE, PENNSYLVANIA.

HORSESHOE.

1,113,734.   Specification of Letters Patent.   Patented Oct. 13, 1914.

Application filed March 28, 1914. Serial No. 828,072.

*To all whom it may concern:*

Be it known that I, ANDREW BALAJTHY, a subject of the King of Hungary, residing at Phoenixville, in the county of Chester and State of Pennsylvania, have invented certain new and useful Improvements in Horseshoes, of which the following is a specification, reference being had therein to the accompanying drawing.

This invention relates to horse shoes and has for its object to provide a shoe of such class, with means in a manner as hereinafter set forth, for detachably connecting the shoe body to the horse's hoof without the employment of nails.

Further objects of the invention are to provide a horse shoe which is simple in its construction, strong, durable, preventing the hoof of the animal from becoming injured or chafed, efficient and convenient in its use, readily attached to the hoof of the animal, and comparatively inexpensive to manufacture.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a side elevation of a horse shoe in accordance with this invention, showing the adaptation thereof with respect to the hoof of the animal; Fig. 2 is a top plan view thereof, the hoof being shown in section; Fig. 3 is a sectional detail of one of the side plates, the hoof being shown in section; Fig. 4 is a sectional detail of the toe plate, the hoof being shown in section; Fig. 5 is a top plan view of the shoe removed from the hoof; Fig. 6 is a perspective view of the protective member for the rear of the hoof; Fig. 7 is a perspective view of the coupling bar for the upright heel members; Fig. 8 is a sectional detail of the protective member; Figs. 9 and 10 are sectional details of the retaining links; Fig. 11 is a perspective view of one of the heel members; and Fig. 12 is an elevation, partly in section, of a modified form of shoe body.

Referring to Figs. 1 and 5 of the drawings, the shoe body is formed of two sections, one of which, as indicated at 13, is the tread section and is provided with integral heel calks 14, and the other of which is the hoof section and which is indicated at 15. The rear of the hoof section projects beyond the calks of the tread section, and said hoof section 15 is extended and bent upwardly to provide heel members 16—17, which engage the rear of the hoof 18, and each of which is provided with an opening 19. The upper face of the section 15 is provided with pockets 20 which extend upon the heel members 16—17 and in each of the pockets 20 is arranged a cushion 21 to prevent any possibility of the hoof being chafed at the point where the heel members 16 merge into the body of the hoof section 15. The tread section 13 is detachably connected to the hoof section 15 by screws 22 or other suitable removable securing devices. The hoof section 15 at the toe thereof is provided with a pair of vertically disposed spaced apertured lugs 23, and at each side thereof with a pair of spaced vertically disposed apertured lugs 24. When the shoe is positioned against the hoof, the latter is cut away at 25 to provide a clearance for the lugs 24, and is cut away at 26 to provide a clearance for the lugs 23.

Referring to Fig. 12 of the drawings, the shoe body which is indicated at 27 is not formed of two sections, but of a single member, and has an integral toe calk 28 and removable heel calks 29. The shoe body 27 is provided with the spaced apertured lugs 30 which correspond with the lugs 23, the spaced apertured lugs 31 which correspond to the apertured lugs 24, and with heel members 32 which correspond to the heel members 16—17. The shoe body 27 has pockets 33 corresponding to the pockets 20, and in said pockets 33 are mounted cushions 34 corresponding to the cushions 21.

Each of the heel members has its rear face formed with a recess 35, which opens at the inner edge of the heel member and which provides a seat for a purpose to be presently referred to.

The reference character 36 denotes curved side plates, each of which has its inner face provided with a pocket 37 having arranged therein a cushion 38. Each of said plates has an apertured lug 39 projecting laterally from its outer face, and is further provided with a depending apertured lug 40 which extends between the pair of lugs 24, and is pivotally connected therewith by a pin 41.

The reference character 42 denotes a toe plate, having each end thereof provided with an eye 43, and its inner face with a pocket 44, in which is arranged a cushion 45. The plate 42 has a depending apertured lug 46, which extends between the pair of lugs 23 and is pivotally connected with said lugs 23 by a pin 47.

Extending through each of the lugs 39 is a tie bar consisting of a shank 48 having each end provided with an eye 49, and the forward eyes of said tie bars are connected to the eyes 43 through the medium of coupling links 50 and rings 51. Each of the coupling links 50 has its rear end provided with an opening 52 through which extends an eye 49, and the forward end of each of the links 50 has an opening 53 through which extends a ring 51. The rings 51 engage with the eyes 43. The inner face of each of the coupling links 50 is provided with a pocket 54 in which is seated a cushion 55.

The tie members are connected to the heel members 16—17 through the medium of adjustable coupling links 56, and the forward end of each of said links 56 has an opening 57, through which extends the rear eye 49 of the tie member. The inner face of each of the links 56 is formed with a pocket 58 in which is arranged a cushion 59. The inner end of each of the links 56 is cylindrical as at 60, and provided with peripheral threads. The threaded inner ends 60 of the links 56 extend through the openings 19 and further extend through the offset squared ends 61 of a curved coupling bar 62. The offset ends 61 of the bar 62 are seated in the recesses 35, and the said ends are provided with openings 63 which register with the openings 19. Mounted upon the threaded ends 60 of the links 56 are nuts 64 which abut against the squared ends 61 of the bar 62. The bar 62 couples the heel members 16—17 or 32 together, and the said bar 62 projects forwardly toward the rear of the hoof and carries an adjustable clamping screw 65.

Arranged at the rear of the hoof and extending from the upper portion of one heel member to the other, is a protective member for the rear of the hoof, and which consists of a pair of cup-shaped portions 66—67 connected together by a web 68 having its upper end provided with an interiorly threaded pocket 69 for the reception of the screw 65, whereby the protective member will be maintained in position. Each of the cup-shaped portions 66—67 of the protective member is lined with a cushion 70, which bears against the hoof.

What I claim is:—

1. A horse shoe comprising a shoe body provided with heel members, hoof engaging side plates pivotally connected to said shoe body and each having its inner face provided with a cushion, a hoof engaging toe plate pivotally connected to the shoe body and having its inner face provided with a cushion, means for connecting said toe plate to said heel members, said means slidably connected to said side plates, a coupling bar extending in and connected to said heel members, and a protective member engaging the rear of the hoof and maintained in position by said coupling bar, said protective member having its inner face provided with cushions.

2. A horse shoe comprising a shoe body, a plurality of hoof engaging plates pivotally connected to said shoe body, said shoe body provided with upwardly extending heel members, means for connecting said plates to said heel members whereby the plates are maintained in position, each of said plates having its inner face provided with a cushion, a coupling bar extending in and connecting said heel members together and maintained in position by said means, and a protective member having its ends extending between the heel members and the hoof, and maintained in position by said coupling bar.

In testimony whereof I affix my signature in the presence of two witnesses.

ANDREW BALAJTHY.

Witnesses:
Louis Suga,
Charles Lattel.

---

Copies of this patent may be obtained for five cents each, by addressing the "Commissioner of Patents, Washington, D. C."